Dec. 9, 1941. R. L. WORRELL 2,265,412
ADJUSTABLE REEL MOUNTING FOR HARVESTERS
Filed May 18, 1940
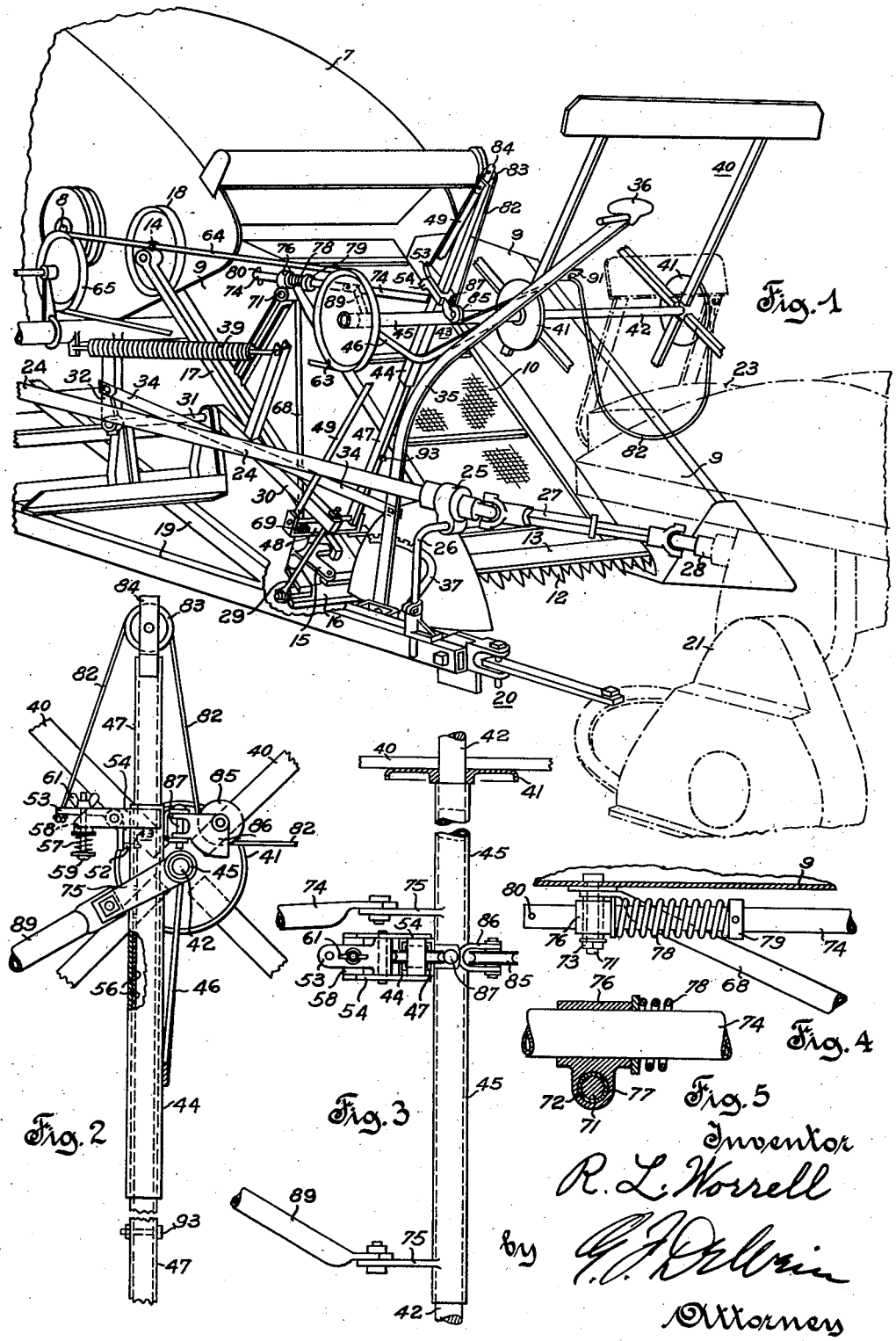

Patented Dec. 9, 1941

2,265,412

UNITED STATES PATENT OFFICE 2,265,412

ADJUSTABLE REEL MOUNTING FOR HARVESTERS

Robert L. Worrell, La Porte, Ind., assignor to Allis-Chalmers Manufacturing Company, Milwaukee, Wis., a corporation of Delaware Application May 18, 1940, Serial No. 335,911

14 Claims. (Cl. 56—221)

The present invention relates in general to harvesters or harvester-threshers, and more particularly to the mounting of a gathering reel on such apparatus so as to permit ready adjustment of the position of the reel by the operator from his normal position under the various conditions of operation of the machine.

In the operation of harvesting machinery in the field, particularly where the machine is operated and controlled by one man, and especially where the machine is drawn by a tractor and the operator drives or controls the tractor in addition to giving the required attention to the operation of the harvester, it is highly desirable that the required operation or control of the harvester, to secure best results where the grain or the like is of varying height or condition in different parts of the field, be simply and easily effected and require minimum effort and attention on the part of the operator, independently of the position in which the reel may be at the time of adjustment. And with the gathering reel of the harvester mounted on a header platform which itself is adjustable to different heights above the ground, it is particularly desirable that, independently of the position of the header platform and of the reel with respect to the header platform, the operating control for adjusting the position of the reel be at all times readily available and capable of effecting the desired adjustment of the reel by a simple actuating movement of the control by the operator from his normal position during operation of the machine.

The present invention contemplates the provision in a harvesting machine of a gathering reel and improved mounting and control therefor which permits the operator of the machine to effect desired adjustment of the reel from a convenient point of control and by a very simple operation, independently of the particular position of the reel at the time of adjustment.

It is an object of the present invention to provide in a harvester an improved design and construction of adjustable mounting for a rotatable gathering reel and adjustment control therefor which affords maximum facility for securing ready adjustment of the reel with respect to its support from all operating positions of the reel.

It is a further object of this invention to provide an adjustable reel mounting and control of this character, and one which insures that the reel is securely held in any desired position of adjustment thereof.

It is a further object of this invention to provide an adjustable reel mounting and control of this character, wherein the reel is held in definite position of adjustment by a releasable latch and the desired degree of raising or lowering of the reel is effected through a flexible actuating element extending to a convenient point of control adjacent the position of the operator.

It is a further object of this invention to provide an adjustable reel mounting and control of the above described character wherein the desired control of the raising and lowering adjustment of the reel may be accomplished through imparting an operating force to the control in a single direction.

These and other objects and advantages are attained by the present invention, various novel features of which will be apparent from the description herein and the accompanying drawing, disclosing an embodiment of the invention, and will be more particularly pointed out in the annexed claims.

In the drawing:

Fig. 1 is a broken perspective view from the front right hand side of a harvester-thresher embodying the present invention;

Fig. 2 is an enlarged side elevation of a portion of the reel support of the apparatus shown in Fig. 1, with the reel post tilted toward the vertical for convenience of illustration;

Fig. 3 is an enlarged plan view of a detail of the apparatus of Figs. 1 and 2;

Fig. 4 is an enlarged plan view of a further detail of the apparatus shown in Fig. 1; and Fig. 5 is an enlarged sectional view of a detail shown in Figs. 1 and 4.

In the drawing, 7 represents the housing for the threshing and separating mechanism of a harvester-thresher, the housing being mounted on a supporting structure of conventional wheeled type, and the forward portion of the housing being shown in Fig. 1. 8 indicates a shaft, provided with a driving sheave, on which the threshing cylinder is mounted. A header platform, comprising a supporting frame and side walls 9 thereon, is pivotally mounted on the forward end of the housing 7, and includes an endless traveling conveyer 10 of the draper type, the upper side of which travels upwardly and rearwardly from the forward portion of the platform at which point the cutting sickle 12 and the stationary guard 13 therefor are mounted in conventional operative relation. The feed draper 10 is driven by a driving roller mounted on a shaft 14 rotatably mounted in the side walls of the housing 7, the axis of this shaft coinciding with the axis of the pivotal mounting of the header platform on the housing 7. The cutting sickle 12 is driven in reciprocating fashion from a bell crank lever 15 mounted on an extending portion of a supporting bracket 16 carried by the header platform, and the bell crank 15 is actuated by a pitman 17, the latter being operated by an eccentric connection to a driving sheave 18 on the shaft 14.

The housing 7, with a header platform pivotally mounted thereon, is carried by a supporting frame structure of conventional wheeled type and having a draft frame portion 19 extending forwardly at the right hand or stubbleward side of the machine. The forward end of the draft frame is provided with a pivotal connection, as indicated at 20, to a draft beam connected to the drawbar of a tractor, indicated generally at 21, the rear portion of which is shown in dotted outline, and the seat of the tractor being indicated at 23. A drive shaft 24 for actuating the mechanism of the harvester-thresher has its forward end position rotatably mounted in a bearing 25 supported on an adjustable pedestal 26 carried on the forward portion of the draft frame 19; and the forward end of this drive shaft is connected, through a universally flexible drive connection 27, to a power takeoff shaft 28 on the tractor.

The header platform is maintained in desired operative position of adjustment relative to the ground through a link connection, indicated at 29, from a portion of the bracket 16 to the forward end of an arm 30 carried by a shaft 31 pivotally mounted on the draft frame 19 and having an arm 32 thereon connected by a rod 34 to an adjusting lever 35 pivotally mounted at its lower end on the draft frame 19 and having its upper or handle end 36 in a position within convenient reach of the operator when he is seated on the tractor seat. The lever 35 is preferably provided with a conventional form of detent latch, actuable from the handle end of the lever and cooperative with detent notches in a quadrant 37 mounted on the forward end of the draft frame 19 and over which the lower part of the lever moves. Through the latching of the lever 35 to the quadrant 37, the forward end of the header platform is held in desired position of adjustment. The weight of the header platform is counterbalanced to a desired degree by a tension spring 39 connected at its forward end to a projection on the pivoted arm 30 and at its rear end to a part of the supporting frame of the harvester-thresher.

A rotatable gathering reel 40, in the form of a plurality of spaced bats mounted on sets of spaced radial arms secured to disks or hubs 41, is mounted, through these hubs, and on a shaft 42. This shaft is rotatably supported in a bearing portion of a bracket 43. This bearing bracket includes a sleeve portion 44 preferably of rectangular cross-section, with a tubular bearing portion 45 of extended length and integral or rigidly united to the sleeve portion, the reel shaft 42 being rotatably mounted within the bearing portion 45. This bearing portion is preferably further connected to the body portion of the bracket 43 through a bracing connection 46 having an intermediate part thereof secured to the sleeve portion of the bracket and secured at its ends to end portions of the bearing portion 45. The sleeve portion of the bearing bracket has a sliding fit over a reel post 47, preferably tubular and of rectangular cross-section, pivotally mounted at its lower end on a bracket 48 attached to the header platform, so that the post is permitted to swing in a vertical plane longitudinally of the machine. The fit of the sleeve portion of the bearing bracket over the reel post is a relatively close guided fit, but still one which permits easy sliding of the sleeve along the post. This pivoted post preferably is provided with a bracing rod 49, pivotally secured at its lower end to the bracket 48 which supports the post 47, and with the same pivotal axis as the latter, and at its upper end to an upper end portion of the post.

The bearing bracket 43, with the reel shaft carried thereby, is held in desired position on the reel post 47 by a detent portion 52 on the lower end of a depending arm of a latch lever 53 of bell crank form which is pivotally mounted between spacing arms of an auxiliary bracket portion 54 rigidly attached to the upper portion of the sleeve of the bearing bracket. The detent portion 52 passes through an opening in the sleeve portion 44 and is adapted to engage with any one of a series of abutment portions associated with the post 47, to thereby hold the bearing bracket in any one of the corresponding positions of adjustment on the post. These abutment portions on the reel post are preferably constituted by the walls surrounding apertures 56 in the rear side of the hollow post 47 and of a size into which the detent portion 52 may pass readily with an easy but fairly close fit with the wall of the aperture, to thereby firmly hold the bearing bracket in definite position on the post. The latch lever 53 at the rear side of the reel post is biased by a spring 57 so as to urge and hold the detent 52 in latching position with respect to the post 47, this spring bearing against an upper abutment 58 at the lower edge of the side arms of the bracket 54, and bearing at its lower end against the head of a bolt 59, directly or through the intermediary of an abutment washer, this bolt passing upwardly through the spring, the abutment 58, and the horizontal arm of the latch 53. This bolt is held in position, with facility for adjustment of the degree of compression of the spring 57, by a wing nut 61 bearing against the upper face of the latch 53. And the spring, acting through the bolt 59, urges the latch in a direction to maintain and hold the detent 52 within an aperture 56 in the reel post, to thus hold the bearing bracket and the reel carried thereby in definite adjusted position on the reel post 47.

The reel shaft is driven by a sheave 63 on its stubbleward end, this sheave being driven, preferably by a V-belt 64, from a driving sheave 65 mounted on a shaft carried by a suitable support on the frame of the machine. This belt connection between sheave 65 and sheave 63 on the reel shaft serves to limit the forward movement of the bearing bracket and the reel shaft carried thereby.

The reel post mounting may be braced by a rod 68 having its forward end secured by a bolt 69 on the bracket 48 on which the reel post is mounted. Preferably, the bolt 69 may serve as a pivot on which the bell crank lever 15 oscillates. The rear end of the rod 68 is flattened and apertured and secured in position on the stubbleward side wall 9 of the header platform. The flattened rear end of this rod 68 is preferably secured in position by a bolt 71 passing through such side wall from the inner face thereof, the end of the rod bearing against the side wall, directly or through the intermediary of a washer, and through a tubular spindle 72, with a nut 73 threaded on the outer end of the bolt and bearing on the outer end of the spindle 72, directly or through the intermediary of a washer, and serving to hold the spindle and the rear end of the rod 68 clamped in position.

The reel post and the reel shaft bearing support carried thereby are resiliently braced against rearward movement and urged forwardly in a direction to establish suitable tautness of the driving belt 64 by a bracing element including a rod 74 attached, as by a bolt, to the bearing bracket or a projection 75 thereon, here shown as being mounted on the reel shaft bearing portion 45. The rear end of the bracing rod 74 passes through a guiding aperture in a bearing element 76. This element has formed therewith at its lower side a sleeve portion 77 which is bored to have a bearing fit over the tubular spindle 72 so as to be rotatable thereon. The bearing element 76 is placed in position, with the sleeve portion 77 over the spindle 72, before the latter is secured in position by the nut 73. A compression spring 78 surrounds the rod 74, this spring bearing at its rear end against the forward face of the element 76, or an adjacent abutment washer, and bearing at its forward end against an abutment collar 79 held in position on the rod 74, as by a setscrew. The spring 78 serves to yieldingly urge the rod 74, and the bearing bracket and the reel post 47 in a forward direction, thus serving to maintain the reel driving belt 64 taut. The normal biasing effect of the spring 78 on the rod 74 may be adjusted by adjusting the fixed position of the abutment collar 79 on such rod. The connection of the bearing bracket 45 of the reel shaft to the bracing rod 74 may be supplemented through use of a diagonal brace rod 89 connected at its rear end to the rod 74, forwardly of the collar 79, and at its front end to a projection 75 near the stubbleward end of the bearing portion 45. A stop 80, as in the form of a removable pin, may be provided at the rear end of the rod 74 to limit the forward movement of the rod in case the belt 64 should be removed.

The bearing bracket 43, with the reel shaft carried thereby, may be readily and simply adjusted along the reel post so as to position the reel at desired height above the forward or sickle end of the header platform. A flexible cord or cable 82 has an operating connection with the bracket portion 54 and to the latch lever 53 mounted thereon, this connection being such that, on initial actuation of the cord 82, the latch 53 is actuated to withdraw the detent 52 from the aperture 56 in the reel post, and, on continued actuation of the cord, the entire bearing bracket is raised along the post. As shown, the cord 82 has one end attached to the end of the horizontal arm of the latch 53, and this cord passes over a guide sheave 83 rotatably mounted in a bracket 84 mounted adjacent the upper end of the reel post 47, the cord thence passing downwardly at the forward side of the reel post and under a second guide sheave 85 rotatably mounted in and between confining walls of a bracket 86 having a swivel connection, through a pin 87, about an axis parallel to the reel post, with a bifurcated portion 89 preferably carried by the portion 54 of bearing bracket 43. The bracket 86 and the guide sheave 85 carried thereby are free to turn on the swivel connection 87, and thus serve to guide the cord 82 so that an actuating pull may be exerted thereon from any point, within a wide lateral range, forwardly of the reel post.

In a harvester of the type shown, where the tractor operator alone is capable of operating the harvester as to any necessary adjustments during operation thereof, the forward end of the cord 82 may be carried to and temporarily attached to some point on the tractor, with the cord hanging in a loose loop between such point of attachment and the guide sheave 85, so that the operator, in his normal position on the tractor, can easily reach the loose cord to impart an actuating pull thereto. An intermediate point of loose support for the actuating cord 82 may be provided through a ring or tubular guide, indicated at 91, on the actuating lever 35; or the forward end of the cord may be held by this guide element 91, with the cord swinging on a loose loop between this point and the guide sheave 85.

In normal operation of the tractor-propelled harvester, the reel may be considered as being set at a particular elevation above the forward or sickle end of the header platform, generally as indicated in the drawing. Assuming that it is now desired to raise the position of the reel on the reel post, the operator imparts a pull on the cord 82, sufficient at least to lift the rear end of the latch lever 53 against the action of the biasing spring 57, and this pull serving to first withdraw the detent 52 from latching association with the wall of the aperture 56 in reel post 47 without raising the bearing bracket, the detent and its mounting on the bearing bracket serving as a lost-motion connection between the cord and the bearing bracket during this initial pull on the cord; and if a pull of sufficient force is maintained on the cord 82, the spring 57 is further compressed, so that the spring and the bolt 59 serve as a mechanical connection between the cord and the portion 54 of the bearing bracket, and the latter is caused to slide upward along the reel post to any desired position thereon. On reaching such desired position, the pull on the cord is quickly released, and the spring 57 forces the detent 52 of the latch lever into the next adjacent aperture 56 in the reel post before the guide sleeve has a chance to fall beyond this point, and the bearing bracket and reel shaft and reel carried thereby are held securely in the new position of adjustment on the reel post.

If it is desired to lower the reel, a pull of only sufficient force to release the detent 52, against the action of the spring 57, is applied to the cord 82, and the bearing bracket is thus permitted to drop to any desired lower position of adjustment. On reaching the desired lower position, the pull on the cord 82 is released quickly and the spring 57 forces the detent 52 into the adjacent aperture 56 in the reel post, to thus hold the parts in the desired lower position of adjustment. The weight of the bearing bracket 45 and the parts carried thereby are such that, once the detent 52 is released, the bearing bracket and attached parts will drop immediately unless an additional restraining pull is applied to the cord 82; and this pull can be varied to permit any desired speed of downward movement of the bearing bracket.

A limiting stop, which may be in the form of a bolt 93 passing through and secured to the reel post 47, is preferably provided so as to serve, through engagement of the lower end of the sleeve portion 44 of the bearing bracket with such bolt, to limit the downward movement of the guide sleeve on the reel post.

It will be apparent that as the bearing bracket 43 and the reel shaft carried thereby move up and down on the reel post, the rod 74, attached to the bearing bracket, changes its angularity, which it is free to do by reason of the sleeve portion 77 of the element 76 being free to rotate on the spindle 72, and follows the up and down movement of the bearing bracket. And with the reel post pivoted at its lower end and the resilient connection, through the spring 78, of the bracing rod 74 to the header platform, this rod 74 urges the pivoted reel post forwardly to a position wherein the desired tautness of the driving belt 64 is maintained, independently of the position of the bearing bracket and reel shaft on such post.

Through the provision of the reel mounting and adjustment described hereinabove, the reel is held securely in the desired position of adjustment above the forward or sickle end of the header platform; and it can be readily adjusted by the operator, either upwardly or downwardly as desired, to a new position of adjustment, by simply pulling and releasing the pull on the operating cord 82, with an operating portion of the latter always in a position wherein it is most convenient for actuation by the operator. And this desired up and down adjustment can be readily accomplished independently of the position of the reel on the reel post and independently of the position of the header platform with respect to the ground.

It should be understood that the invention disclosed herein is not limited to the exact details and features of construction and operation shown and described herein, and that it includes various modifications embraced within the annexed claims.

It is claimed and desired to secure by Letters Patent:

1. In a harvesting machine, a gathering reel having a rotatable shaft, an upwardly extending post mounted on a supporting portion of the machine, a bracket carrying a bearing for said reel shaft and mounted in cooperative guided relation with respect to and adjustable along said post, means for holding said bearing bracket in different positions of adjustment along said post, said means comprising a holding element associated with one of said cooperative parts and biased to holding engagement with one of a series of holding elements associated with the other of said parts, and means for adjusting the position of said bearing bracket along said post comprising an actuating element having an operating connection with said biased holding element and a lost-motion operating connection with said bearing bracket and actuatable through a relatively light pull applied thereto in one direction to release said biased holding element from holding engagement with the other of said holding elements and thereby permit said bearing bracket to move to a lower position along said post, and actuatable through a heavier pull applied thereto in said direction to raise said bearing bracket to a higher position along said post, and said biased holding element being automatically engageable in cooperative relation with the adjacent one of said series of holding elements on release of all actuating pull upon said actuating element to thereby hold said bearing bracket in the corresponding position of adjustment along said post.

2. In a harvesting machine, a gathering reel having a rotatable shaft, an upwardly extending post mounted on a supporting portion of the machine, a bracket carrying a bearing for said reel and mounted in guided relation with respect to and adjustable along said post, means for supporting said bracket in different positions of adjustment along said post, said means comprising a holding latch on said bracket and biased into holding engagement with a selected one of a series of holding abutments spaced along the length of said post, means for adjusting the position of said bearing bracket along said post, said latter means comprising an actuating element having a lost-motion operating connection to said bearing bracket and an operating connection to the holding element thereon, said actuating element being operative initially on application of force thereto in one direction to release said latch and being operative thereafter on continued application of force thereto in said direction to move said bearing bracket upwardly along said post, and said latch on release of all operating force on said actuating element being automatically engageable with the adjacent abutment on said post to thereby hold said bearing bracket in the corresponding position of adjustment along said post.

3. In a harvesting machine, a gathering reel having a rotatable shaft, an upwardly extending post mounted on a supporting portion of the machine, a bracket carrying a bearing for said reel shaft and mounted in cooperative guided relation with respect to said post and slidable therealong to different positions of adjustment thereon, means for supporting said bearing bracket in different positions on said post, said means comprising a series of abutments on and spaced along the length of said post, latch means movably mounted on said bearing bracket and biased into holding engagement with an adjacent one of said abutments on said post, and means for adjusting said bearing bracket up and down along said post comprising flexible actuating mechanism having an operating connection with said latch means and a lost-motion operating connection with said bearing bracket and extending to a point adjacent the normal position of an operator of the machine, said latch means being releasable from holding engagement with the abutment on said post on initial application of force in one direction to said actuating mechanism and said bearing bracket being movable along said post to a new position of adjustment thereon on continued application of force to said actuating mechanism in said direction, and said latch means being automatically engageable with the adjacent abutment on said post on release of all actuating force on said actuating element to thereby hold said bearing bracket in the corresponding position of adjustment on said post.

4. In a harvesting machine, a gathering reel having a rotatable shaft, an upwardly extending post mounted on a supporting portion of the machine, a bracket carrying a bearing for said reel shaft and slidable along said post to different positions of adjustment thereon, means for supporting said bearing bracket in different positions on said post, said means comprising a series of abutments associated with said post and spaced along the length thereof, a detent latch movably mounted on said bearing bracket and biased into holding engagement with the adjacent one of said abutments of said post, and means for adjusting said bearing bracket up and down along said post comprising actuating mechanism including a flexible cord or the like and having an operating connection with said latch and a lost-motion connection with said bearing bracket, a reaction support adjacent the upper end of said post, said flexible cord passing over said reaction support and extending to a point convenient for manipulation by an operator of the machine, said cord being operable on initial pull thereon to release said latch from holding engagement with the abutment of said post to thereby permit said bearing bracket to drop along said post and being operable on further pull thereon to raise said bearing bracket, and said latch being automatically engageable with the adjacent abutment on said post on release of all pull on said cord to thereby hold said bearing bracket in the corresponding position of adjustment on said post.

5. In a harvesting machine, a gathering reel having a rotatable shaft, an upwardly extending post pivoted adjacent its lower end to swing in a vertical plane extending in the direction of travel of the machine, a bracket carrying a bearing for said reel shaft and mounted in guided relation with respect to and adjustable along said post, means carried by a supporting portion of the machine for yieldingly positioning said bearing bracket and said post in the line of travel of the machine, means for supporting said bearing bracket in different positions of adjustment along said post, said means comprising a holding element movably mounted on said bearing bracket and biased to holding engagement with the adjacent one of a series of cooperative holding elements on said post, and means for adjusting the position of said bearing bracket along said post comprising a flexible actuating element having a lost-motion operating connection to said bearing bracket and an operating connection to said holding element on said bearing bracket, said actuating element being operable through a relatively light pull thereon in one direction to release said holding element on said bearing bracket from supporting engagement with the cooperative holding element on said post to thereby permit said bearing bracket to move to a lower position along said post and operable through a continued and greater force applied thereto in said direction to raise said bearing bracket to a higher position along said post, and said holding element on said bearing bracket being operative on release of all applied force thereon to engage with the adjacent cooperative holding element associated with said post and thereby hold said bearing bracket in the corresponding position of adjustment along said post.

6. In a harvesting machine, a gathering reel having a rotatable shaft, an upwardly extending post mounted on a supporting portion of said machine, a bracket carrying a bearing for said reel shaft and mounted in cooperative guided relation with respect to and adjustable along said post and free to move under the influence of gravity to a lowermost position along said post, means for holding said bracket in different positions of adjustment along said post, said means comprising relatively movable cooperative holding elements associated with said bearing bracket and said reel post, and means for selectively adjusting the position of said bearing bracket along said post comprising a flexible actuating element having an operating connection therefrom to one of said holding elements and a lost-motion operating connection to said bearing bracket, and guide means associated with said post above said bearing bracket for guiding a portion of said actuating element, said actuating element extending from said guide to a convenient position for manual operation thereof and being operable by a relatively light force applied thereto in one direction to release the cooperative engagement of said holding elements and thereby permit said bearing bracket to move to a lower position along said post and being operable by a relatively greater force applied thereto in said direction to raise said bearing bracket to a higher position along said post, and said holding elements being automatically engageable in cooperative relation on release of all actuating force applied to said actuating element to thereby hold said bearing bracket in the corresponding position of adjustment along said post.

7. In a harvesting machine, a gathering reel having a rotatable shaft, an upwardly extending post mounted on a supporting portion of said machine, a bracket carrying a bearing for said reel shaft and mounted in cooperative guided relation with respect to and adjustable along said post and free to move under the influence of gravity to a lowermost position along said post, means for holding said bracket in different positions of adjustment along said post, said mean comprising relatively movable cooperative holding elements associated with said bearing bracket and said reel post, and means for selectively adjusting the position of said bearing bracket along said post comprising a flexible actuating element having an operating connection therefrom to one of said holding elements and a lost-motion connection to said bearing bracket, and guide means associated with an upper portion of said post and a portion of said bearing bracket forwardly of said post for guiding said flexible actuating element, said actuating element being carried forwardly and having an actuating portion adjacent the position of the operator of the machine, and said actuating element being operable by a relatively light pull applied thereto to release the cooperative engagement of said holding elements and thereby permit said bearing bracket to move to a lower position along said post and being operable by a heavier pull applied thereto to raise said bearing bracket to a higher position along said post, and said holding elements on release of all actuating pull on said actuating element being automatically engageable in cooperative relation to thereby hold said bearing bracket in the corresponding position of adjustment along said post.

8. In a harvesting machine, a gathering reel having a rotatable shaft, an upwardly extending post mounted on a supporting portion of the machine, a supporting bracket carrying a bearing for said reel shaft and slidable along said post to different positions of adjustment thereon, means for supporting said bearing bracket in different positions on said post comprising a series of abutments on said post in the form of a plurality of apertures in said post spaced along the length thereof, a detent latch movably mounted on said bearing bracket and biased into holding engagement with the wall of an adjacent one of said apertures in said post, means for adjusting said bearing bracket up and down along said post comprising an actuating mechanism including a flexible cord or the like having an operating connection with said latch and a lost-motion connection with said bearing bracket and extending to a point adjacent the normal position of an operator of the machine, said cord being operable on a slight pull thereon to release said latch from holding engagement within the aperture on said post and thereby permit said bearing bracket to drop along said post and being operable on a heavier pull thereon to raise said bearing bracket along said post, and said latch being free to automatically engage with the wall of the adjacent aperture of said post on release of all pull on said cord to thereby hold said bearing bracket in the corresponding new position of adjustment on said post.

9. In a harvesting machine, a gathering reel having a rotatable shaft, an upwardly extending post pivoted adjacent its lower end on a supporting portion of the machine, said post being provided with a series of apertures spaced along the length of the post, a bracket carrying a bearing for said reel shaft and slidable along said post, means for supporting said bearing bracket in different positions on said post, said means comprising a detent latch carried by said bearing bracket, a spring bearing on said latch and said bearing bracket and serving to bias said detent latch into holding engagement with the wall of an adjacent one of said apertures in said post, and means for adjusting said bearing bracket along said post comprising an actuating mechanism including a flexible cord or the like and having an operating connection with said latch, a guide for said flexible element mounted adjacent the upper end of said post, said flexible element passing upwardly from its connection with said latch and over said guide and thence extending to a point adjacent the normal position of an operator of said machine, said flexible element being operable through a relatively light pull thereon to release said detent from holding engagement with said post to thereby permit said bearing bracket to drop along said post and being operable through a continued heavier pull thereon exerted through said latch and said spring to raise said bearing bracket along said post to a higher position of adjustment thereon, and said detent being automatically engageable with the adjacent aperture in said post on release of all pull on said cord.

10. In a harvesting machine, a gathering reel having a rotatable shaft, an upwardly extending post pivoted adjacent its lower end on a supporting portion of the machine, said post being provided with a series of abutments spaced along the length of the post, a bracket carrying a bearing for said reel shaft and slidable along said post, means for supporting said bearing bracket in different positions on said post, said means comprising a series of abutments on said post and spaced along the length thereof, a detent latch movably mounted on said bearing bracket at one side of said post, means for biasing said detent into holding engagement with the adjacent one of said abutments on said post, means for effecting the up and down adjustment of said bearing bracket along said post comprising an actuating mechanism including a flexible cord or the like having connection with said detent latch, a guide for said flexible element mounted on said post adjacent the upper end thereof, a second guide for said flexible element mounted on said bearing bracket at the side opposite the connection of said cord element to said latch, said flexible element passing upwardly from its connection with said latch and said bearing bracket and over said first guide and downwardly beneath said second guide and extending to a point convenient for operation from the normal position of an operator of the machine, said cord being operable through a relatively light pull thereon to release said latch from holding engagement with the abutment on said post to thereby permit said bearing bracket to drop along said post and being operable through a heavier pull thereon acting through said latch and said spring to raise said bearing bracket along said post, and said detent latch being automatically engageable with the adjacent abutment on said post on release of all pull on said cord to thereby hold said bearing bracket in the corresponding new position of adjustment on said post.

11. In a harvesting machine having a header platform pivoted on a supporting portion of the machine for up and down movement relative thereto, an upwardly extending post mounted on said header platform and provided with a series of abutments spaced along the length of the post, a gathering reel having a rotatable shaft, a bracket carrying a bearing for said reel shaft and slidable along said post, means for supporting said bearing bracket in different positions on said post comprising a detent latch movably mounted on said bearing bracket and biased into holding engagement with the adjacent one of said abutments on said post, and means for adjusting said bearing bracket along said post, said adjusting means comprising an actuating mechanism having a flexible operating connection with said latch and said bearing bracket, a guide mounted adjacent the upper end of said post, said flexible connection passing upwardly from its point of connection with said latch and said bearing bracket and over said guide and said actuating mechanism extending to a point adjacent the normal position of an operator of the machine, and said flexible actuating mechanism being operable through a relatively light pull thereon and independently of the position of said header platform to release said latch from holding engagement with the abutment on said post and thereby permit said bearing bracket to drop along said post and operable on continued heavier pull to raise said bearing bracket along said post, and said latch being automatically engageable with the adjacent abutment on said post on release of all pull on said flexible actuating element to thereby hold said bearing bracket in the corresponding new position of adjustment on said post.

12. In a harvesting machine having a header platform pivotally mounted on a supporting portion of the machine for up and down movement thereon, an upwardly extending post pivotally mounted adjacent its lower end on the header platform to swing in a vertical plane longitudinally of the machine, a yielding brace mounted on a supporting portion of the machine and biasing said post forwardly about its pivotal mounting, a gathering reel having a rotatable shaft, a bracket carrying a bearing for said reel shaft, said bearing bracket being mounted in guided relation with respect to and adjustable along said post, means for supporting said bracket in different positions of adjustment along said post comprising a holding element movably mounted on said bearing bracket and biased to a supporting holding engagement with different ones of a series of cooperative holding abutments on said post, means for adjusting the position of said bearing bracket along said post comprising an actuating element provided with a flexible portion having a lost-motion connection to said bearing bracket and an operating connection to said holding element thereon, said actuating element being operative initially to release the holding element on said bearing bracket from holding engagement with the cooperative holding element on said post to thereby permit said bearing bracket to move to a lower position along said post and being effective on continued operation thereof in the same direction as said releasing operation to raise said bearing bracket to a higher position along said post, and said holding element on said bearing bracket being operative on release of all applied force to engage with the adjacent cooperative holding element on said post to thereby hold said bearing bracket in the corresponding position of adjustment along said post.

13. In a harvesting machine, a gathering reel having a rotatable shaft, and mechanism for supporting said reel shaft in selected operative position on said machine and comprising a bearing bracket carrying a bearing in which said shaft is rotatable, an upwardly extending post carried by said machine and along which said bearing bracket is adjustable, a movable holding element carried by said bearing bracket and biased into holding engagement with said post and effective to hold said bearing bracket in different selected positions of adjustment on said post, and means for adjusting the position of said bearing bracket on said post comprising an actuating element operatively connected with said holding element and operatively connected with said bearing bracket through a lost-motion connection, and a reaction support for said actuating element disposed adjacent the upper portion of said post, said actuating element bearing upon and being guided by said reaction support and extending therefrom to a convenient point for manipulation by an operator, said holding element being releasable from holding engagement with said post on initial actuating movement of said actuating element and said bearing bracket being movable upwardly along said post on the continued actuating movement of said actuating element.

14. In a harvesting machine, a gathering reel having a rotatable shaft, and mechanism for supporting said reel shaft in selected operative position on said machine and comprising a bearing bracket carrying a bearing in which said shaft is rotatable, an upwardly extending post carried by said machine and along which said bearing bracket is adjustable, a movable holding element carried by said bearing bracket and biased into holding engagement with said post and effective to hold said bearing bracket in different selected positions of adjustment on said post, and means for adjusting the position of said bearing bracket on said post comprising a flexible cord or like actuating element operatively connected with said holding element and operatively connected with said bearing bracket through a lost-motion connection, and guide means mounted on said post at a point upwardly of said bearing bracket, said cord or the like passing over and being guided by said guide means and having an extension to a point adjacent the normal position of an operator of the machine, said holding element being releasable from holding engagement with said post on initial actuating movement of said cord or the like and said bearing bracket being movable upwardly along said post on continued actuating movement of said cord or the like.

ROBERT L. WORRELL.